United States Patent
Weck

(10) Patent No.: US 6,537,000 B1
(45) Date of Patent: Mar. 25, 2003

(54) TOOL FIXING DEVICE IN A TOOL HOLDER

(76) Inventor: Manfred Weck, Im Weingarten 16, D-52074 Aachen (DE)

( * ) Notice: Subject to any disclaimer, the term of this patent is extended or adjusted under 35 U.S.C. 154(b) by 0 days.

(21) Appl. No.: 09/719,075

(22) PCT Filed: May 14, 1999

(86) PCT No.: PCT/DE99/01486

§ 371 (c)(1),
(2), (4) Date: Feb. 27, 2001

(87) PCT Pub. No.: WO99/64193

PCT Pub. Date: Dec. 16, 1999

(30) Foreign Application Priority Data

Jun. 6, 1998 (DE) .......................... 198 25 373

(51) Int. Cl.⁷ .............................. B23C 5/20; B23B 31/08
(52) U.S. Cl. ...................... 409/141; 279/16; 408/143; 409/234
(58) Field of Search .................. 279/16, 9.1, 157, 279/103, 46.2–46.5, 4.03; 408/143; 409/234, 141

(56) References Cited

U.S. PATENT DOCUMENTS

| | | | | | |
|---|---|---|---|---|---|
| 2,596,821 | A | * | 5/1952 | Parkins | 279/16 |
| 3,463,048 | A | * | 8/1969 | Owsen | 409/141 |
| 3,499,350 | A | * | 3/1970 | Hahn | 408/143 |
| 3,499,351 | A | * | 3/1970 | Jacobson | 408/143 |
| 5,322,304 | A | * | 6/1994 | Rivin | 279/103 |
| 5,688,163 | A | * | 11/1997 | Siden | 279/157 |
| 5,915,892 | A | * | 6/1999 | Glimpel et al. | 279/16 |
| 5,957,016 | A | * | 9/1999 | Segalman | 409/141 |
| 5,978,816 | A | * | 11/1999 | Cook | 409/141 |
| 6,082,236 | A | * | 7/2000 | Andreassen | 408/143 |
| 6,280,126 | B1 | * | 8/2001 | Slocum et al. | 409/141 |

* cited by examiner

*Primary Examiner*—Steven C. Bishop
(74) *Attorney, Agent, or Firm*—Gudrun E. Huckett

(57) ABSTRACT

A tool fixing device for clamping a tool in a tool holder, wherein the tool holder has a receptacle configured to clamp a shaft of the tool, has at least one static flexible element inserted into a force flow between the tool and the tool holder. The static flexible element is designed to damp tilting and bending vibrations of the tool in cooperation with a damping element provided in the receptacle at the free end of the shaft of the tool. This prevents chattering of the tool.

15 Claims, 5 Drawing Sheets

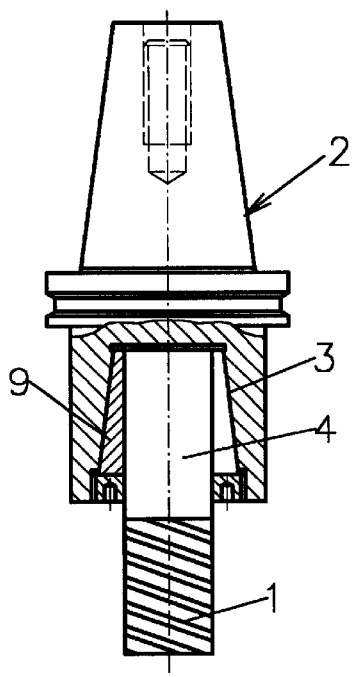
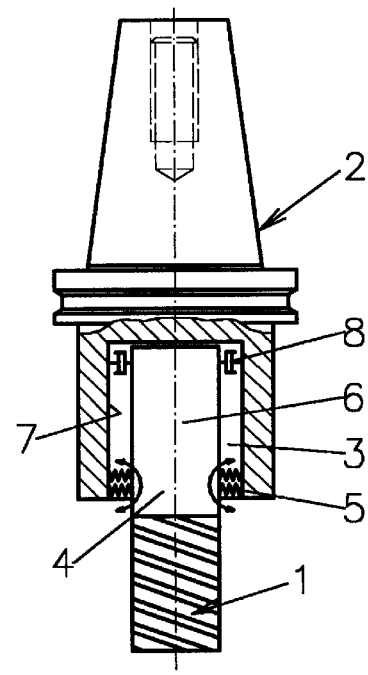
Fig.2
Prior Art
Fig.1

Comparison of radial dynamic flexibility of the tool at its tip for a rigid (original tool) and damped fixing device

TOOL FIXING DEVICE IN A TOOL HOLDER

BACKGROUND OF THE INVENTION

1. Field of the Invention

The invention relates to a tool fixing device in a tool holder in whose receptacle a shaft of the tool is clamped.

2. Description of the Related Art

In known tool fixing devices (FIG. 2) a shaft 4 of a tool 1 is clamped rigidly in a receptacle 3 of a tool holder 2 by means of a clamping member 9 seated in the tool holder 2. Slim tools, for example, end milling cutters or boring bars, often produce vibration amplitudes during machining because of their minimal flexural strength and system damping action which vibration amplitudes in most cases occur in the form of a regenerative chatter. These vibrations can only be avoided by reducing the cutting depth of the tool. Slim end milling cutters are, for example, used for milling pockets, for milling deep-drawing and forging tools as well as for producing integral components for aircraft construction. The load or performance limit is the chatter tendency of the tool as a result of its minimally damped bending vibration.

However, boring operations with boring bars having a length/diameter ratio >4 are also limited in regard to their efficiency as a result of their chatter tendency. This holds true for stationary drilling tools on turning machines as well as for rotating boring tools on horizontal boring mills and milling machines.

SUMMARY OF THE INVENTION

The invention has the object to design the fixing device of the aforementioned kind such that the chatter vibrations during machining of a workpiece can be prevented without reducing the load or efficiency limits of the tool.

In accordance with the invention, this object is solved for the fixing device of the aforementioned kind in that in the force flow between the tool and the tool holder at least one static flexible element is inserted which has a high damping action.

In the fixing device according to the invention at least one static flexible element which has a high damping action is inserted into the force flow between the tool and the tool holder. As a result of this damped clamping action, the tool can yield in a springy way relative to the tool holder. As a result of the high damping action, the tool does not chatter even when it has a great length and/or is very slim. The corresponding damping element is mounted at the location of greatest relative movement between the shaft end of the tool and the tool holder. As a result of the fixing device according to the invention, the tool shaft can perform a tilting movement about its clamping location which serves as a pivot point.

Further features of the invention result from, the description and the drawings.

BRIEF DESCRIPTION OF THE DRAWING

The invention will be explained in more detail with the aid of two embodiments illustrated in the drawings. It is shown in:

FIG. 1a schematic illustration of a tool fixing device according to the invention;

FIG. 2a tool fixing device of the prior art in an illustration corresponding to that of FIG. 1;

DESCRIPTION OF THE PREFERRED EMBODIMENTS

Figure 3:
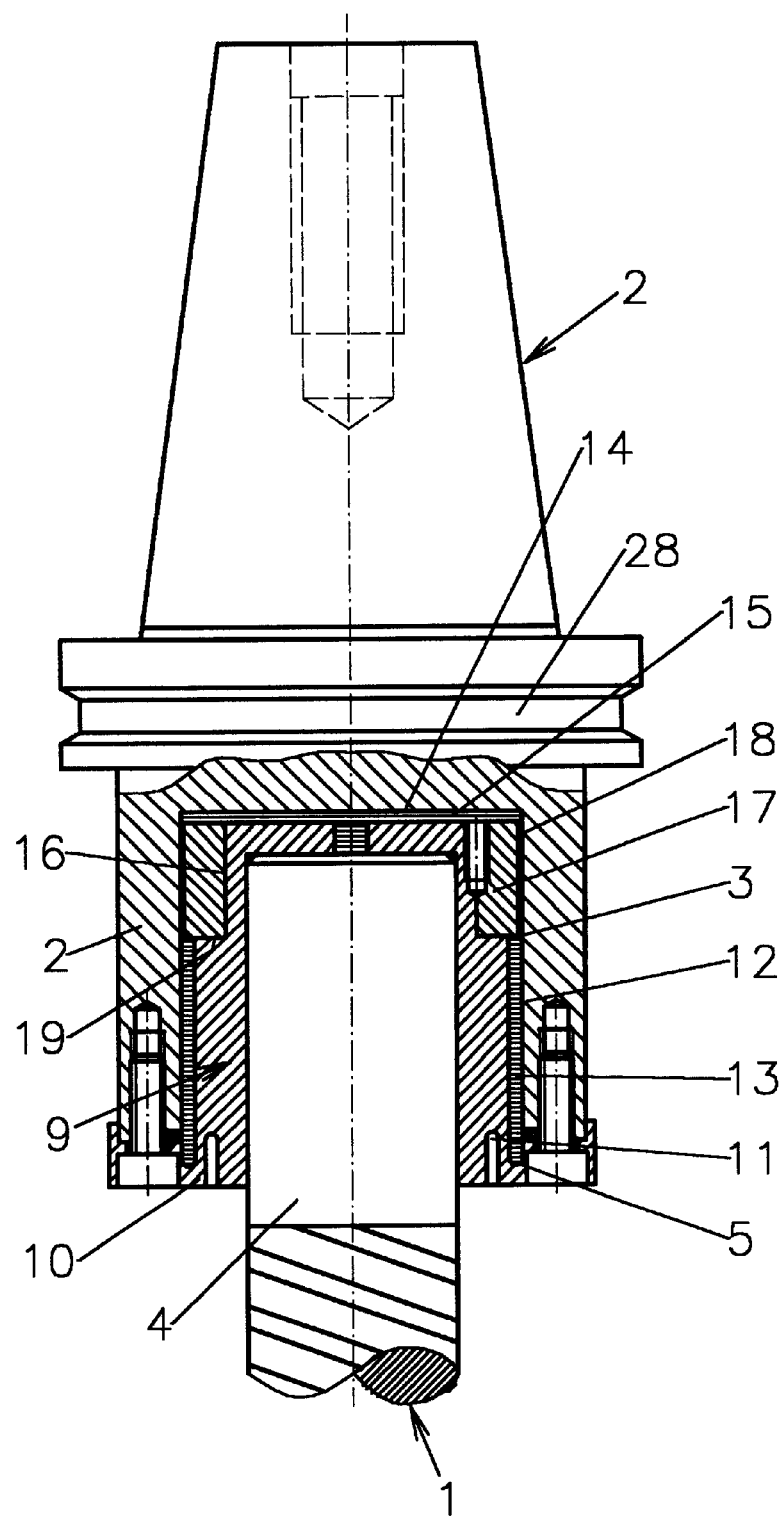
FIG. 3 and FIG. 4 three different embodiments of the tool fixing device according to the invention in axial section.
Figure 3A:
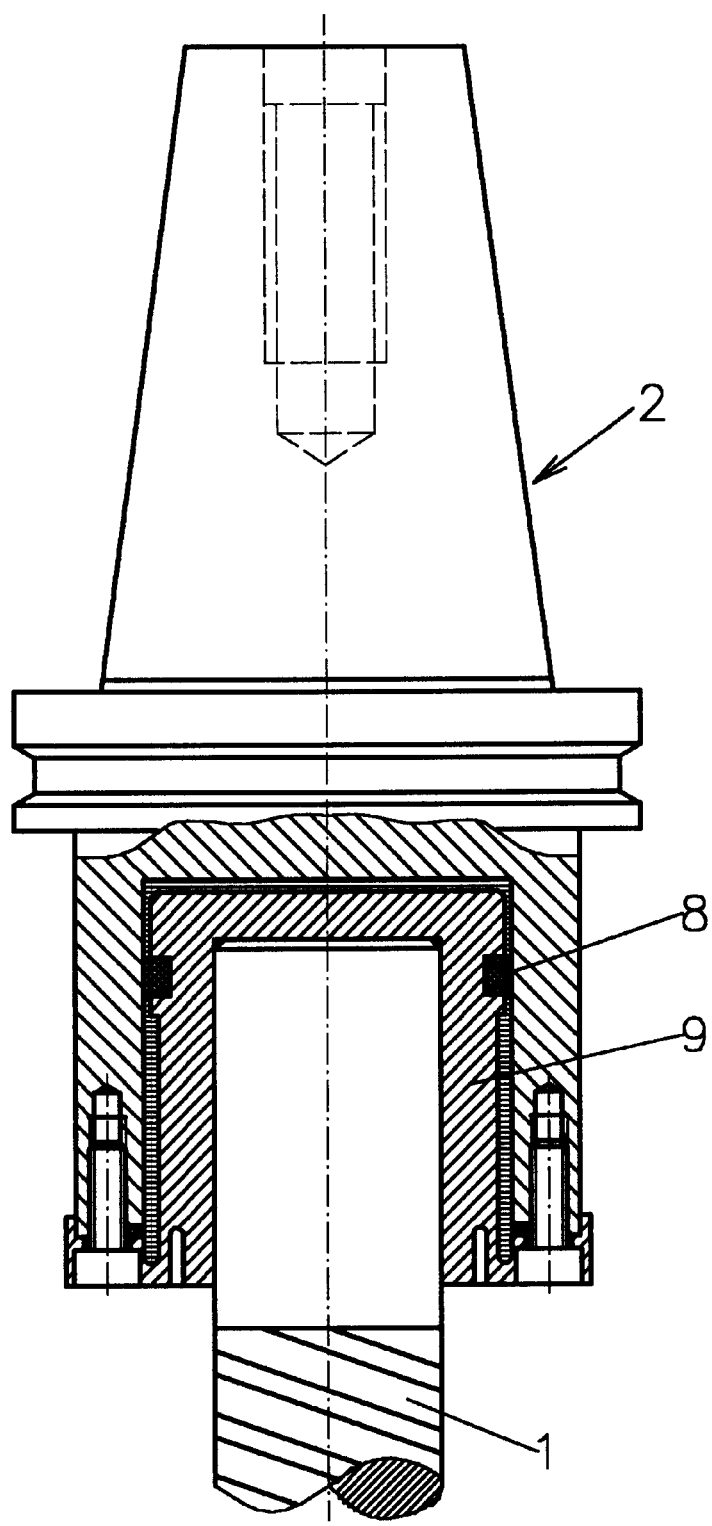
FIG. 3a a view similar to FIG. 3, showing an elastic ring in a groove of the sleeve.

FIG. 1 show schematically a tool 1 which is received in a tool holder 2. The tool 1 can be, for example, an end milling cutter, a boring bar and the like. The tool holder 2 can be embodied as a quick-release taper, HSK, VDI shaft, and the like. The tool 1 is received via the tool holder 2 in a spindle (not illustrated) with which the tool 1 can be driven in rotation. The tool holder 2 has a cylindrical receptacle 3 into which the shaft 4 of the tool 1 projects. A static flexible element 5 that has a directed high damping action 8 is inserted into the force flow between tool 1 and tool holder 2. The tool shaft 4 tilts about a springy clamping location (pivot point). In this connection, the free shaft end is radially deflected the farthest. At least one damping element 8 is provided on this location of greatest relative movement between the shaft end 6 and the inner wall 7 of the receptacle 3. It is advantageously a squeeze-film damper but can also be, for example, a rubber damper, for example, in the form of an O-ring. By means of a static flexible element 5, which can also be a membrane spring, a spiral spring or another elastic element, the tool shaft 4 is clamped in a soft-sprung fashion in the tool holder 2. The tool shaft 4, and thus the tool 1, can accordingly perform a tilting movement about this clamping location that serves as a pivot point.

FIG. 3 shows a first embodiment of such a tool fixing device. The shaft 4 of the tool 1 is received in a sleeve 9 which is detachably fastened by means of a radially outwardly projecting flange 10 on the end face of the tool holder 2. In the sleeve 9 a depression 11 is provided at the free end and surrounds the shaft 4 at a minimal spacing. The depression is open toward the end face of the sleeve 9.

Within the receptacle 3 of the tool holder 2 the sleeve is surrounded by an annular space 12 in which a pressure medium 13, preferably oil, is present The annular space 12 is limited radially outwardly by the inner wall of the receptacle 3. The annular space 12 extends minimally past the tool holder 2 into the flange 10 of the sleeve 9.

The sleeve 9 has a bottom 15 positioned opposite the bottom 14 of the receptacle 3 at a minimal axial spacing. Starting at the bottom 15, the outer diameter of the sleeve 9 is reduced so that a circumferential depression 16 open toward the bottom 15 is formed in which a ring 17 is positioned. The outer diameter of the ring 17 is slightly smaller than the inner diameter of the receptacle 3 so that between the ring 17 and the inner wall of the receptacle 3 a narrow, annular damping gap 18 is formed which is in communication with the annular space 12 and in which pressure medium is present also. The ring 17 rests against a radially outwardly oriented annular shoulder 19 of the sleeve 9 and projects radially past the outer wall of the sleeve. Accordingly, the annular space 12 is radially wider than the damping gap 18.

Since the annular space 12 extends axially slightly past the tool holder 2 into the flange 10 of the sleeve 9, a narrow annular stay is formed between the surrounding depression 11 and the radially adjacent part of the annular space 12. It forms the static flexible element 5. The tool 1, as a result of this annular stay-shaped element 5, can carry out relatively large movements relative to the tool holder 2 when radially loaded. The shaft end accordingly performs a relatively large movement so that the damping element in the form of the described oil displacement system 12, 18 can be provided in the receptacle 3 of the tool holder 2. The pressure medium 13 which is present in the annular space 12 as well as in the damping gap 18 provides an excellent damping action. As a result of the described elastic tool fixing device with its high damping action, chatter vibrations of the tool 1 can be suppressed excellently. The tool fixing device is excellently suitable for slim tools which, because of their minimal flexural strength and system damping action, often perform during machining great vibration amplitudes which occur in the form of regenerative chatter. The use of the described tool fixing device allows great cutting depths of the tool 1 without risking a chatter tendency. The tool fixing device is also excellently suitable for boring operations with tools 1 in the form of boring bars having a length/diameter ratio >4. Since a chatter tendency does not occur as a result of the elastic and damped tool fixing device, the efficiency of such long and thin boring bars is not impaired.

Instead of the described pressure medium displacement system, the shaft end in the receptacle 3 of the tool holder 2 can also be surrounded by at least one rubber element and the like as a static flexible element. An excellent damping action can also be achieved with such mechanical components.

Even though the elastic tool fixing device results in a reduced total static strength at the tool tip in the radial direction, the resonance increase can be considerably reduced, for example, by a factor 5 to 50, by means of a corresponding adjustment of the clamping strength and damping action between the tool holder 2 and the tool shaft 4.

Figure 4:
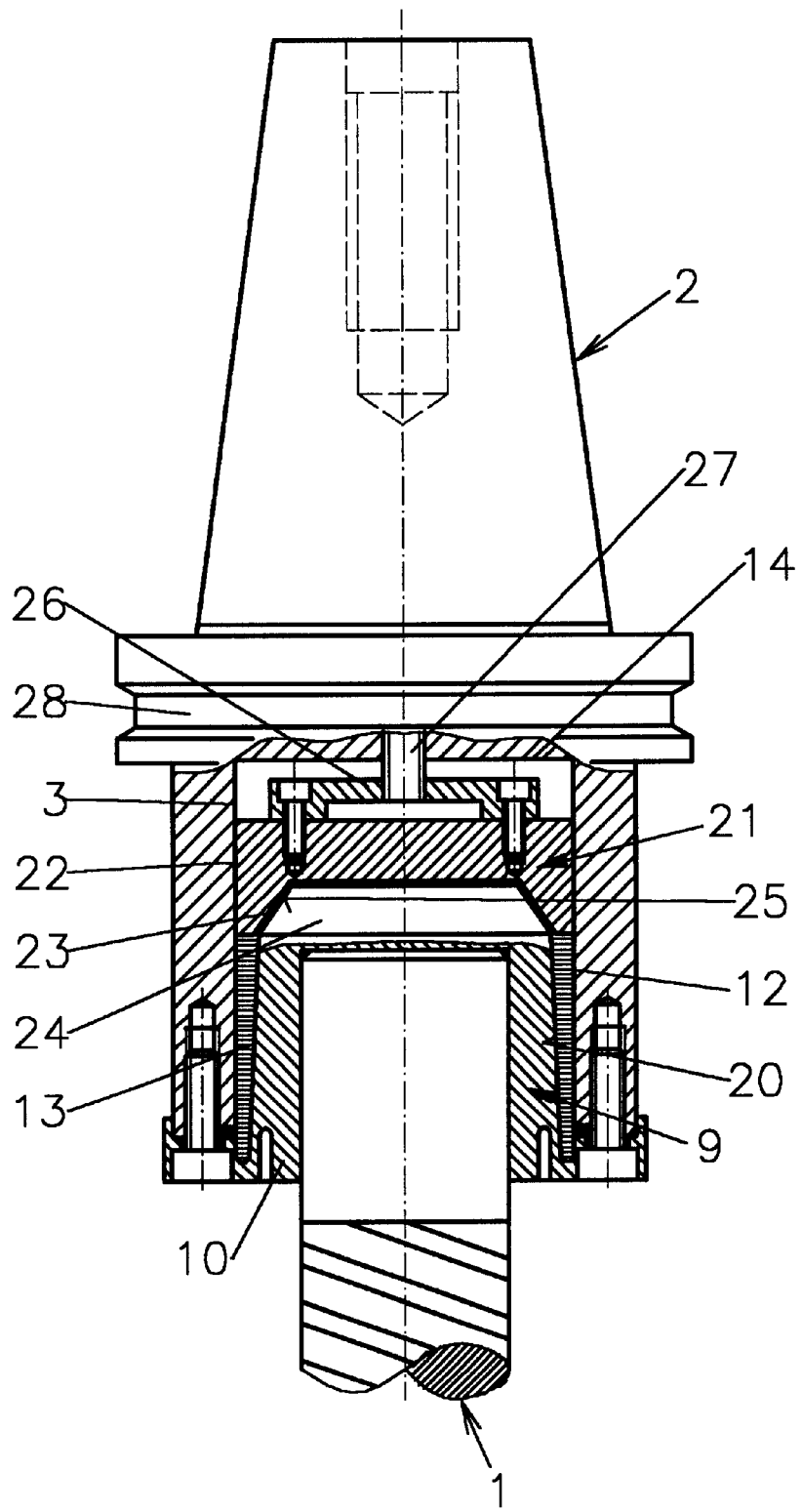

When in the case of special requirements, for example, with respect to narrow dimensional tolerances for the machining carried out by the tool 1, the increased static yielding action as a result of the elastic clamping action is not permissible during machining of the tool 1, the yielding of the fixing device can be eliminated if needed; however, the advantage of the increased damping action is no longer provided. FIG. 4 shows an embodiment for such of configuration of the elastic tool fixing device. The sleeve 9 is shorter than in the previous embodiment and has a conical mantle 20 whose diameter increases steadily in the direction toward the flange 10 of the sleeve 9. Accordingly, between the cylindrical inner wall of the receptacle 3 of the tool holder 2 and the sleeve 9 an annular space 12 is formed which tapers in the direction toward the flange 10 and in which the pressure medium 13, preferably oil, is present. This annular space 12 is closed in the direction toward the bottom 14 of the receptacle 3 by an axially adjustable cone sleeve 21. It rests with its cylindrical outer mantle 22 against the inner wall of the receptacle 3. It has a central depression 23 in its end face facing the sleeve 9 which conically widens in the direction toward the sleeve 9 and surrounds a matching conical projection 24 of the sleeve 9 at a minimal spacing. Between this projection 24 and the sidewall and the bottom of the depression 23 a gap-shaped damping space 25 is formed which is connected to the annular space 12. Accordingly, the pressure medium 13 is also present in the damping gap 25.

The cone sleeve 21 is fastened on a support 26 which is provided at the free end of an adjusting rod 27. It projects into the receptacle 3 and extends through the tool holder 2. The adjusting rod 27 can be axially displaced by a drive (not illustrated). By doing so, the width of the cone-shaped damping space 25 can be adjusted. When the cone sleeve 21 is moved upwardly from its position according to FIG. 4, the width of the cone-shaped damping gap 25 will increase. Accordingly, the damping action, which is provided by the pressure medium contained therein, is reduced; however, the total system damping action increases thereby. When the adjusting rod 27, in the illustration according to FIG. 4, is moved in the downward direction the gap width of the damping gap 25 is reduced. It can be reduced to such an extent that the shaft end is fixedly clamped in the tool holder 2. Accordingly, by means of the adjusting element in the form of the cone sleeve 21, the system damping action can be adjusted optimally with regard to a particular application, respectively. When during machining, for example, during precision machining, a rigid fixation of the tool 1 in the tool holder 2 is required, the upper tool end can be fixedly clamped by a corresponding reduction of the gap width of the damping gap 25 toward zero.

The two embodiments according to FIGS. 3 and 4 show the flange 10 of the clamping sleeve 9 sealed relative to the tool holder 2. The pressure medium 13 is preferably a hydraulic medium which is present in the closed space 12, 18, 25 or which can be supplied by the machining device (not illustrated) via bores (not illustrated). The tool holders 2 are each provided with a grab groove 28 for a tool changer.

Figure 5:
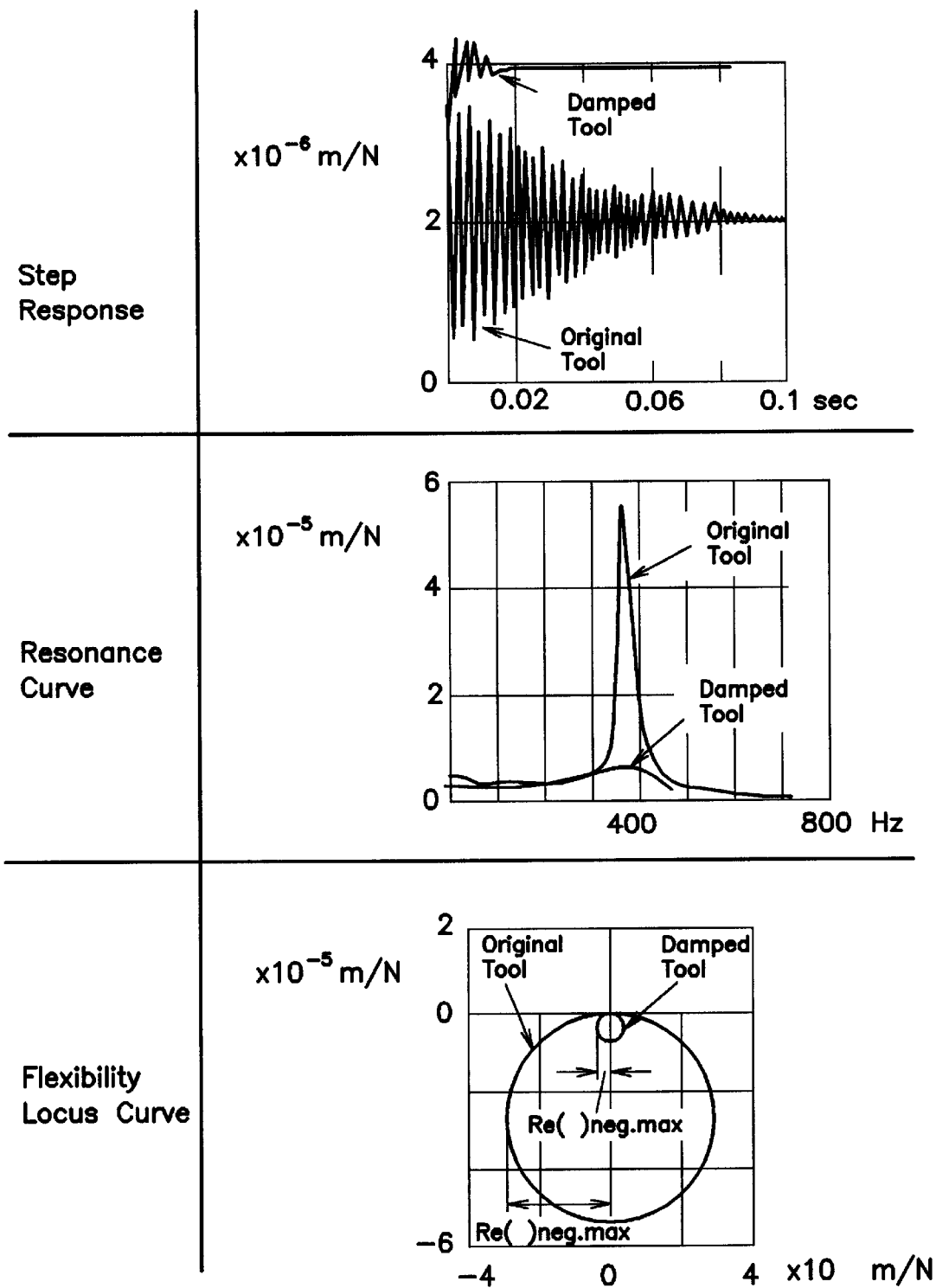
FIG. 5 a comparison of the properties of the tool fixing device according to the prior art and of the tool fixing device according to the invention.

FIG. 5 shows a comparison of the essential differences between the known standard tool fixation device without any damping action and the described damped tool fixation device.

In the upper illustration the step response is illustrated in a diagram. In the undamped tool fixing device the tool (original tool) performs great vibrations during machining which subside only slowly. These un-damped vibrations result in the disadvantageous chatter of the tool during machining. Completely different conditions are present for the damped tool fixation device. The vibrations of the damped tool subside very quickly so that the risk of chatter of the tool, even if it is very long and slim, can be reduced considerably during machining.

In the un-damped tool fixing device a very strong resonance increase results for the tool, while for a tool which is mounted in a damped fashion the resonance ratio is greatly reduced (FIG. 5, center).

According to the reduction of the resonance ratio, the negative real component of the flexibility locus curve for the damped tool fixing device in comparison to the undamped fixation device is significantly reduced. Since the cutting depth that is possible without chatter is reverse-proportional relative to the negative real component (FIG. 5, bottom), an enormous efficiency increase results by means of the damped tool fixing device which increase is greater by a factor 5 to 10 in the illustrated embodiment in comparison to a tool that is clamped without damping.

What is claimed is:

1. A tool fixing device for clamping a tool in a tool holder, wherein the tool holder has a receptacle configured to fixedly clamp a shaft of the tool, said tool fixing device comprising at least one static flexible element inserted into a force flow between the tool and the tool holder and configured to damp tilting and bending vibrations of the tool, further comprising a clamping sleeve configured to be inserted into the receptacle of the tool holder, wherein said at least one static flexible element is provided at least partially in said clamping sleeve.

2. The fixing device according to claim 1, wherein said at least one static flexible element has a springy clamping location.

3. The fixing device according to claim 1, wherein said clamping sleeve has a weakened wall portion forming an articulation.

4. The fixing device according to claim 3, wherein said weakened wall portion is an annular stay of said clamping sleeve.

5. The fixing device according to claim 1, further comprising at least one damping element arranged in the receptacle and configured to act on an end of the shaft of the tool inserted into the receptacle.

6. The fixing device according to claim 5, wherein said at least one damping element is a squeeze-film damper.

7. The fixing device according to claim 5, wherein said at least one damping element is an elastic rubber ring.

8. A tool fixing device for clamping a tool in a tool holders wherein the tool holder has a receptacle configured to clamp a shaft of the tool, said tool fixing device comprising:
- at least one static flexible element inserted into a force flow between the tool and the tool holder and configured to damp tilting and bending vibrations of the tool;
- at least one damping element arranged in the receptacle and configured to act on an end of the shaft of the tool inserted into the receptacle;
- wherein said at least one static flexible element is a spring element.

9. A tool fixing device for clamping a tool in a tool holder, wherein the tool holder has a receptacle configured to clamp a shaft of the tool, said tool fixing device comprising:
- at least one static flexible element inserted into a force flow between the tool and the tool holder and configured to damp tilting and bending vibrations of the tool;
- at least one damping element arranged in the receptacle and configured to act on an end of the shaft of the tool inserted into the receptacle;
- wherein said at least one damping element comprises a pressure medium.

10. The fixing device according to claim 9, wherein said pressure medium is a hydraulic oil.

11. The fixing device according to claim 9, comprising a clamping sleeve configured to be inserted into the receptacle of the tool holder such that a space is formed between said clamping sleeve and the receptacle and said space surrounds said clamping sleeve, wherein said pressure medium is arranged in said space surrounding said clamping sleeve.

12. The fixing device according to claim 11, wherein said at least one damping element comprises a damping gap and wherein said space is connected to said damping gap.

13. The fixing device according to claim 12, wherein said damping gap has an adjustable width.

14. The fixing device according to claim 13, wherein said damping element comprises a pressure member configured to adjust said adjustable width of said damping gap.

15. The fixing device according to claim 14, wherein said damping element further comprises an adjusting rod connected to said pressure member, wherein said adjusting rod penetrates the tool holder and is configured to act axially on said pressure member for adjusting the width of said damping gap.

* * * * *